United States Patent
Abd Elhamid et al.

(10) Patent No.: US 8,431,275 B2
(45) Date of Patent: Apr. 30, 2013

(54) WATER MANAGEMENT OF PEM FUEL CELL STACKS USING SURFACE ACTIVE AGENTS

(75) Inventors: Mahmoud H. Abd Elhamid, Grosse Pointe Woods, MI (US); Gayatri Vyas, Rochester Hills, MI (US); Youssef M. Mikhail, Sterling Heights, MI (US)

(73) Assignee: GM Global Technology Operations, Detroit, MI (US)

( * ) Notice: Subject to any disclaimer, the term of this patent is extended or adjusted under 35 U.S.C. 154(b) by 2311 days.

(21) Appl. No.: 11/286,603

(22) Filed: Nov. 23, 2005

(65) Prior Publication Data

US 2007/0116993 A1 May 24, 2007

(51) Int. Cl.
*H01M 8/04* (2006.01)

(52) U.S. Cl.
USPC ........... 429/413; 429/403; 429/407; 429/408; 429/444; 429/455; 429/456; 429/457; 429/462; 429/514

(58) Field of Classification Search ............. 429/34, 429/403, 407, 408, 413, 444, 455, 456, 457, 429/462, 514
See application file for complete search history.

(56) References Cited

U.S. PATENT DOCUMENTS

| | | | |
|---|---|---|---|
| 6,443,258 B1 * | 9/2002 | Putt et al. ................. | 181/294 |
| 7,205,064 B2 | 4/2007 | Markoski | |
| 2003/0064258 A1 | 4/2003 | Pan | |
| 2004/0131919 A1 * | 7/2004 | Yasumoto et al. ............. | 429/42 |
| 2004/0173783 A1 * | 9/2004 | Curzon et al. ............. | 252/602 |
| 2004/0219420 A1 * | 11/2004 | Tada et al. ............. | 429/44 |
| 2005/0175784 A1 * | 8/2005 | Hasei ............. | 427/402 |
| 2005/0189035 A1 * | 9/2005 | Tanaka ............. | 141/94 |
| 2005/0244696 A1 * | 11/2005 | Kuromatsu et al. ............. | 429/33 |
| 2005/0250730 A1 * | 11/2005 | Yeadon et al. ............. | 514/47 |

FOREIGN PATENT DOCUMENTS

| | | | |
|---|---|---|---|
| JP | 2001-135338 | * | 5/2001 |
| JP | 2001135338 | * | 5/2001 |
| WO | WO 99/60640 A2 | | 11/1999 |

OTHER PUBLICATIONS

Surface-active agent. Encyclopdia Britannica. Encyclopdia Britannica Online. Encyclopdia Britannica, 2010. Web. Apr. 8, 2010 <http://www.search.eb.com/eb/article-9070437>.*

* cited by examiner

*Primary Examiner* — Ula C Ruddock
*Assistant Examiner* — Amanda Barrow
(74) *Attorney, Agent, or Firm* — John A. Miller; Miller IP Group, PLC

(57) ABSTRACT

A fuel cell system that employs a surface active agent that reduces the surface tension of the water in the flow field channels. The fuel cell system includes humidifiers that humidify the cathode inlet airflow and the hydrogen anode gas. The surface active agent is mixed with the humidifying water in the humidifiers so that the surface active agent enters the flow field channels to reduce the surface tension of the water therein, thus allowing the water to wick the channels. In one non-limiting embodiment, the surface active agent is ethanol. Ruthenium can be added to the platinum in the catalyst layers of the fuel cells to mitigate the poisoning of platinum by carbon monoxide, which is one of the oxidation products of ethanol on the cathode side of the fuel cell.

12 Claims, 1 Drawing Sheet

WATER MANAGEMENT OF PEM FUEL CELL STACKS USING SURFACE ACTIVE AGENTS

BACKGROUND OF THE INVENTION

1. Field of the Invention

This invention relates generally to a system and method for providing water management in the flow field channels of a fuel cell stack and, more particularly, to a system and method for providing water management in the flow field channels of a fuel cell stack that includes combining a surface active agent with humidifying water used to humidify the cathode input airflow and the anode input hydrogen gas to reduce the surface tension of the water in the flow field channels allowing the water to wick away.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are popular fuel cells for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion medium layer 20 is provided on the cathode side 12, and a cathode side catalyst layer 22 is provided between the membrane 16 and the diffusion medium layer 20. Likewise, an anode side diffusion medium layer 24 is provided on the anode side 14, and an anode side catalyst layer 26 is provided between the membrane 16 and the diffusion medium layer 24. The catalyst layers 22 and 26 and the membrane 16 define an MEA. The diffusion medium layers 20 and 24 are porous layers that provide for input gas transport to and water transport from the MEA. Various techniques are known in the art for depositing the catalyst layers 22 and 26 on the diffusion medium layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The end product is water, which does not have any negative impact on the environment. A conductive coating 50 can be deposited on the bipolar plate 18 and a conductive coating 52 can be deposited on the bipolar plate 30 to decrease the contact resistance between the plate 18 and the diffusion medium layer 20 and the plate 30 and the diffusion media layer 24.

In this non-limiting embodiment, the bipolar plate 18 includes two sheets 34 and 36 that are stamped and welded together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

As is well understood in the art, the membranes within a fuel cell stack need to have a certain relative humidity so that the ionic resistance across the membrane is low enough to effectively conduct protons. During operation of the fuel cell, moisture from the MEAs and external humidification may enter the anode and cathode flow field channels. At low cell power demands, typically below 0.2 A/cm$^2$, the gas velocity is relatively low, and water may accumulate within the flow channels because the flow rate of the reactant gas is too low to force the water out of the channels. As the water accumulates, it forms droplets that continue to expand because of the relatively hydrophobic nature of the plate material. The contact angle of the water droplets is generally about 90° in that the droplets form in the flow channels substantially perpendicular to the flow of the reactant gas and act to increase the flow resistance in the channels. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

SUMMARY OF THE INVENTION

In accordance with the teachings of the present invention, a fuel cell system is disclosed that employs a surface active agent that reduces the surface tension of the water in the flow field channels. The fuel cell system includes humidifiers that humidify the cathode inlet airflow and the hydrogen anode gas. The surface active agent is mixed with humidifying water in the humidifiers so that the surface active agent enters the flow field channels to reduce the surface tension of the water therein. This will allow the water to wick through the channels, and therefore, less force is required to push the water outside the channels. In one non-limiting embodiment, the surface active agent is ethanol. Ruthenium can be added to the platinum in the catalyst layers of the fuel cells to mitigate the poisoning of platinum by the oxidation product of ethanol.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for using a surface active agent to reduce the surface tension of water within the flow field channels of the fuel cell stack is merely exemplary in nature, and is in no way intended to limit the invention or its applications or uses.

Figure 1:
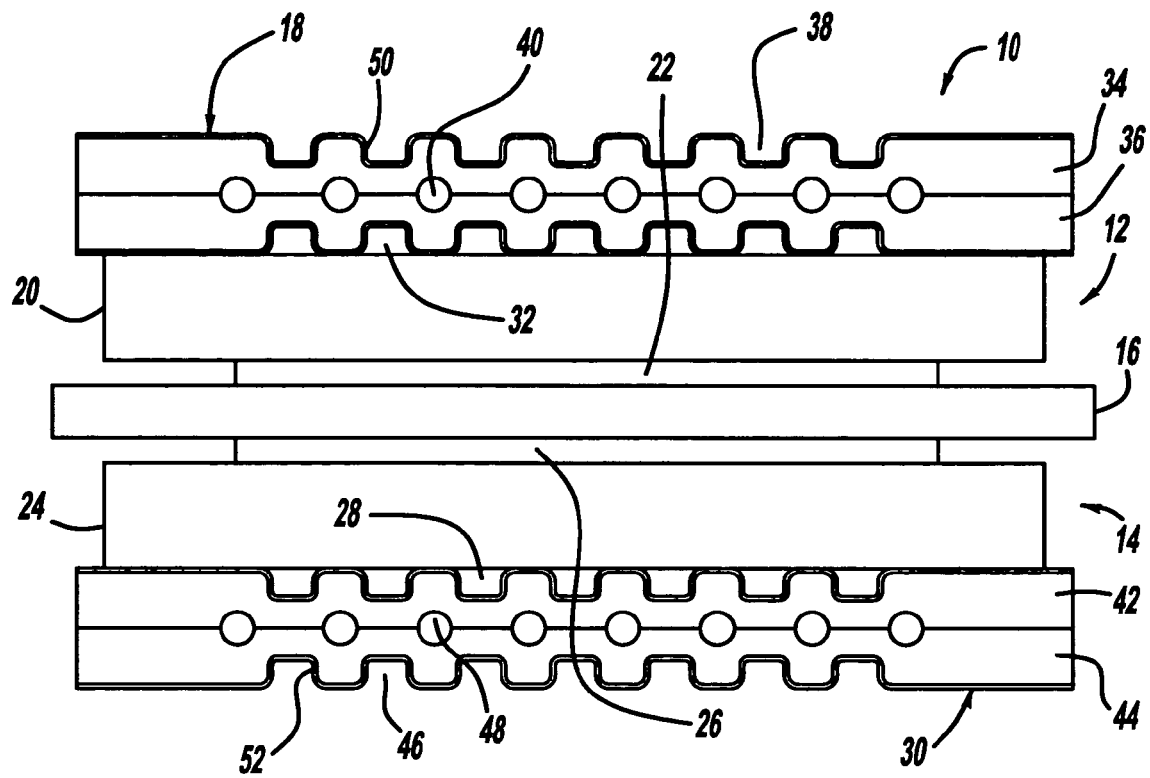
FIG. 1 is a cross-sectional view of a fuel cell in a fuel cell stack.
Figure 2:
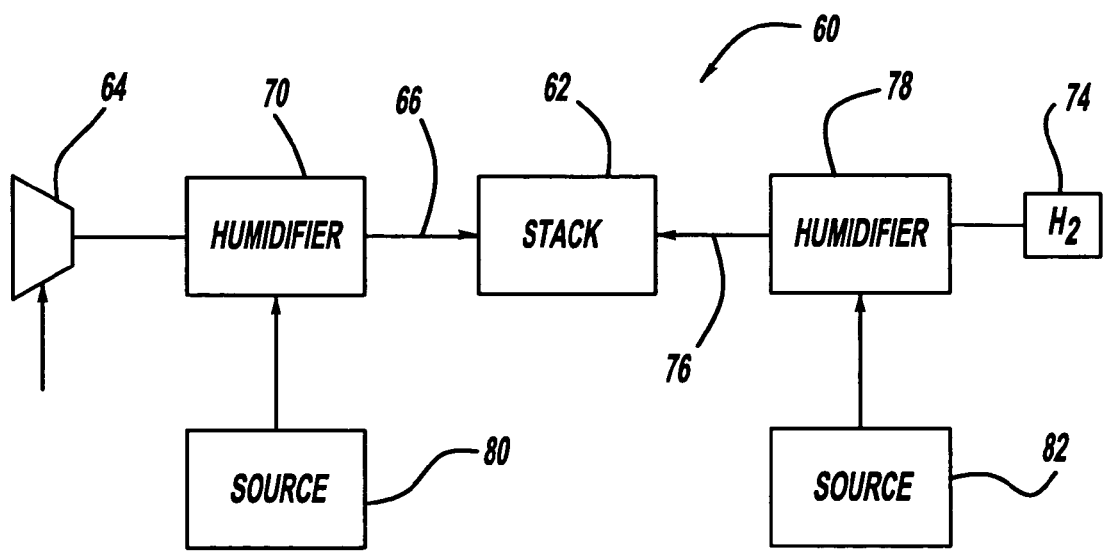
FIG. 2 is a plan view of a fuel cell system that mixes a surface active agent with humidifying water that humidifies the gas sent to the flow field channels in the fuel cell stack.

FIG. 2 is a schematic diagram of a fuel cell system 60 including a fuel cell stack 62. A compressor 64 provides a compressed airflow on line 66 to the cathode side of the stack 62. The airflow from the compressor 64 on the line 66 is directed through a humidifier 70 to humidify the airflow to prevent the membrane 16 from drying out. Likewise, a hydrogen gas source 74 provides hydrogen gas to the anode side of the stack 62 on line 76. The hydrogen gas is also directed through a humidifier 78 to humidify the hydrogen gas to prevent the membrane 16 from drying out, as discussed above. The humidifiers 70 and 78 can be any suitable humidifier for the purposes discussed herein. In one known design, de-ionized water within the humidifiers 70 and 78 is heated to the stack operating temperature by the cooling fluid circulating through the stack 62 so that the water is evaporated to be mixed with the airflow and the hydrogen gas flow. In one embodiment, the humidifiers 70 and 78 are water vapor traps, well known to those skilled in the art.

The present invention proposes the use of wetting or surface active agents added to the de-ionized water in the humidifiers 70 and 78 which will be transported into the cathode side flow field channels 32 and the anode side flow field channels 28 and act to reduce the surface tension of the water therein. Particularly, a suitable surface active agent from a source 80 is provided to the humidifier 70 to be mixed with the water therein and carried by the airflow on the line 66. Likewise, a suitable surface active agent from a source 82 is provided to the humidifier 78 to be mixed with the water therein and carried by the hydrogen gas on the line 72. The amount of the surface active agent from the sources 80 and 82 added to the humidifiers 70 and 78, respectively, is selectively controlled so that the proper amount of the surface active agent is introduced into the flow field channels 28 and 32 to provide the desired contact angle of the water formed in the flow field channels 28 and 32. Preliminary results have shown that the contact angle of the water within the flow field channels can be less than 10° for both carbon composite and metallic bipolar plates by using a suitable surface active agent.

The wetting agent can be any suitable surface active agent that has the potential of reducing the surface tension of water onto solid substrates and is compatible for a fuel cell environment. These materials include, but are not limited to, detergents, polymer based hyper-branched wetting agents, other non-foaming agents such as CoatOSil™, surfactant, EnviroGem® AD01, Photomer® 8127, Flexitane™ 6000, alcohol ethoxylate, Lauryl dimethylbetaine, alkyl phosphate ester, disodium laureth sulfosuccinate, alkyl dimethyl betaine, etc.

In one embodiment, the surface active agent is ethanol, which is well known to reduce the surface tension of water on almost any material. Because ethanol evaporates at about the operating temperature of the stack 62, it should work to reduce the contact angle of the water droplets formed on the flow field channel surfaces by reducing the surface tension of the water therein. Therefore, the ethanol will not significantly evaporate at the operating temperature of the stack 62, but will provide some evaporation.

It is known that alcohol will oxidize under fuel cell conditions in the cathode side of the stack 62. The oxidation of alcohols releases carbon monoxide that can potentially poison the catalyst layers 22 and 26. In order to mitigate this problem, the present invention proposes mixing ruthenium with the platinum in the catalyst layers 22 and 26. Ruthenium will also reduce the platinum loading in the catalyst layers 22 and 26. Naturally occurring platinum ore has been shown to include about 1/10 of ruthenium.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including a cathode side and an anode side;
a compressor providing a compressed airflow to the cathode side of the fuel cell stack;
a cathode side humidifier receiving the airflow from the compressor, said cathode side humidifier humidifying the cathode airflow; and
a source of a surface active agent for providing the surface active agent to the cathode side humidifier, said surface active agent being mixed with water in the cathode side humidifier so that the surface active agent reduces the surface tension of water within flow field channels on the cathode side of the stack.

2. The system according to claim 1 wherein the surface active agent is a detergent.

3. The system according to claim 1 wherein the surface active agent is ethanol.

4. The system according to claim 1 wherein the surface active agent is a polymer based hyper-branched surface active agent.

5. The system according to claim 1 wherein the fuel cell stack includes a plurality of fuel cells each including catalyst layers, wherein the catalyst layers include a mixture of ruthenium and platinum.

6. The system according to claim 1 further comprising a hydrogen source providing a hydrogen gas to the anode side of the fuel cell stack, an anode side humidifier receiving and humidifying the hydrogen gas and a source of a surface active agent providing the surface active agent to the anode side humidifier, said surface active agent being mixed with water in the anode side humidifier so that the surface active agent reduces the surface tension of water within flow field channels on the anode side of the stack.

7. The system according to claim 1 wherein the fuel cell system is on a vehicle.

8. A fuel cell system comprising:
a fuel cell stack including a cathode side and an anode side;
a compressor providing a compressed airflow to the cathode side of the fuel cell stack;
a cathode side humidifier receiving the airflow from the compressor, said cathode side humidifier humidifying the cathode airflow, said cathode side humidifier including a surface active agent that reduces the surface tension of water within flow field channels on the cathode side of the stack;
a hydrogen gas source providing a hydrogen gas to the anode side of the fuel cell stack; and
an anode side humidifier receiving the hydrogen gas from the hydrogen gas source, said anode side humidifier humidifying the hydrogen gas, said anode side humidifier including a surface active agent that reduces the surface tension of water within flow field channels on the anode side of the stack.

9. The system according to claim 8 wherein the surface active agent is a detergent.

10. The system according to claim 8 wherein the surface active agent is ethanol.

11. The system according to claim 10 wherein the fuel cell stack includes a plurality of fuel cells each including catalyst layers, wherein the catalyst layers include a mixture of ruthenium and platinum.

12. The system according to claim 8 wherein the surface active agent is a polymer based hyper-branched surface active agent.

* * * * *